(12) United States Patent  
Begic et al.

(10) Patent No.: US 7,804,955 B2
(45) Date of Patent: Sep. 28, 2010

(54) FLEXIBLE KEY PLATE

(75) Inventors: Stjepan Begic, Bunkeflostrand (SE); William Haywood Tolbert, Malmö (SE)

(73) Assignee: Sony Ericsson Mobile Communications AB, Lund (SE)

( * ) Notice: Subject to any disclaimer, the term of this patent is extended or adjusted under 35 U.S.C. 154(b) by 698 days.

(21) Appl. No.: 11/425,584

(22) Filed: Jun. 21, 2006

(65) Prior Publication Data

US 2007/0298828 A1    Dec. 27, 2007

(51) Int. Cl.
H04M 1/00 (2006.01)
H04M 9/00 (2006.01)

(52) U.S. Cl. .................. 379/433.07; 379/434

(58) Field of Classification Search ........... 379/368, 379/369, 370, 433.06, 433.07; 455/557, 455/550.1, 90.2, 90.3; 341/22
See application file for complete search history.

(56) References Cited

U.S. PATENT DOCUMENTS

| | | | |
|---|---|---|---|
| 4,974,183 A * | 11/1990 | Miller | 708/142 |
| 5,899,616 A * | 5/1999 | Caplan | 400/489 |
| 5,926,119 A | 7/1999 | Lindeman et al. | |
| 6,806,815 B1 * | 10/2004 | Kaikuranta et al. | 341/22 |
| 2001/0048379 A1 * | 12/2001 | Kaikuranta et al. | 341/22 |
| 2002/0190875 A1 * | 12/2002 | Hentunen | 341/22 |
| 2003/0119543 A1 | 6/2003 | Kfoury et al. | |
| 2003/0153349 A1 | 8/2003 | Sun | |

FOREIGN PATENT DOCUMENTS

| | | |
|---|---|---|
| DE | 101 16 556 A1 | 10/2002 |
| EP | 1 505 803 A1 | 2/2005 |
| WO | WO 2004/031930 A1 | 4/2004 |

OTHER PUBLICATIONS

International Preliminary Report on Patentability issued in corresponding international application No. PCT/IB2006/054984, dated Sep. 30, 2008, 6 pages.

* cited by examiner

*Primary Examiner*—Fan Tsang
*Assistant Examiner*—Phylesha Dabney
(74) *Attorney, Agent, or Firm*—Harrity & Harrity, LLP

(57) ABSTRACT

A device includes a front cover with a cutout, a rear cover connected to the front cover, and a substrate including a key pad provided within the front cover and the rear cover. The key pad is substantially aligned with the cutout of the front cover. The device also includes a key top provided adjacent to the key pad through the cutout of the front cover, and a flexible key plate provided over at least the cutout of the front cover and including an opening for receiving the key top.

24 Claims, 7 Drawing Sheets

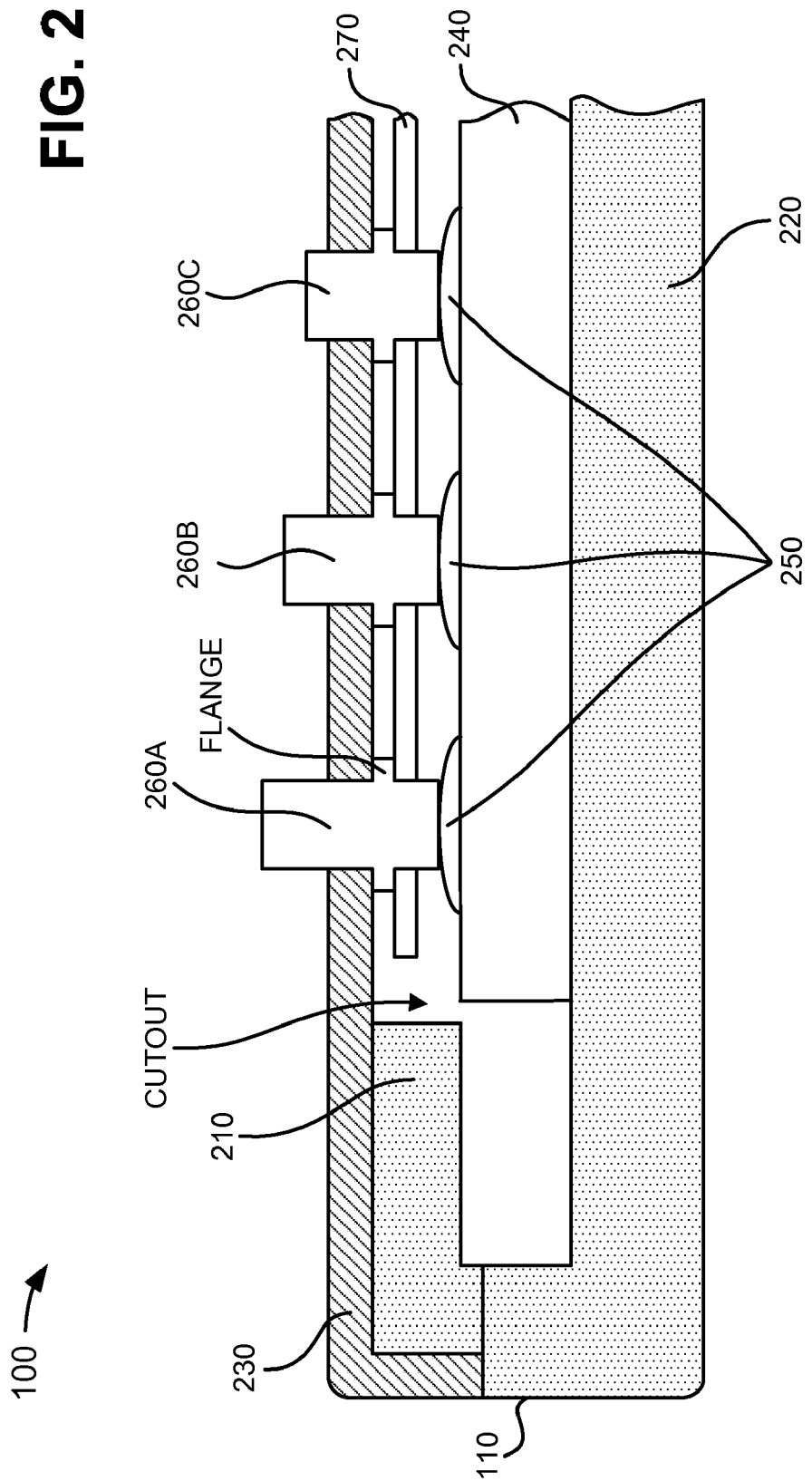

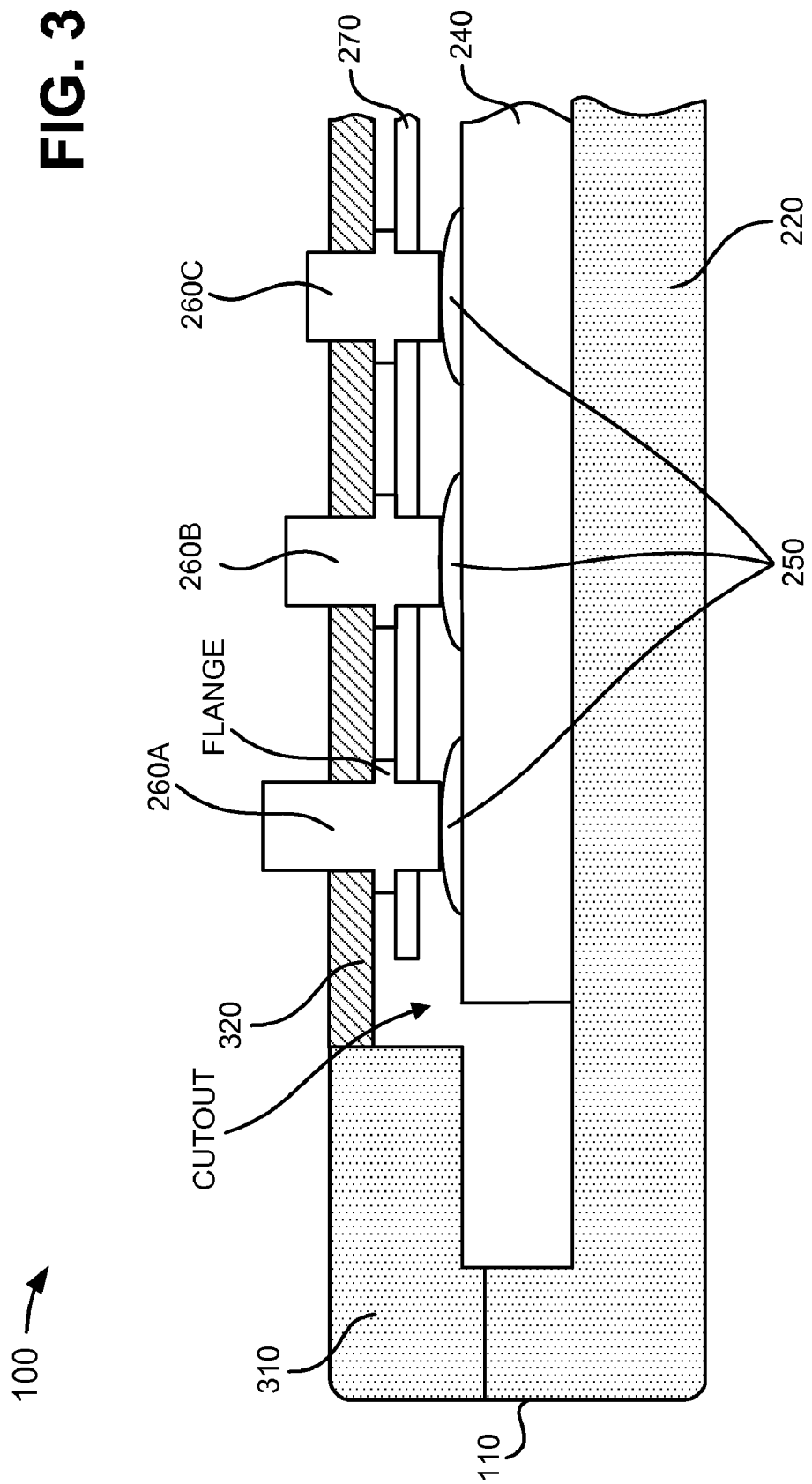

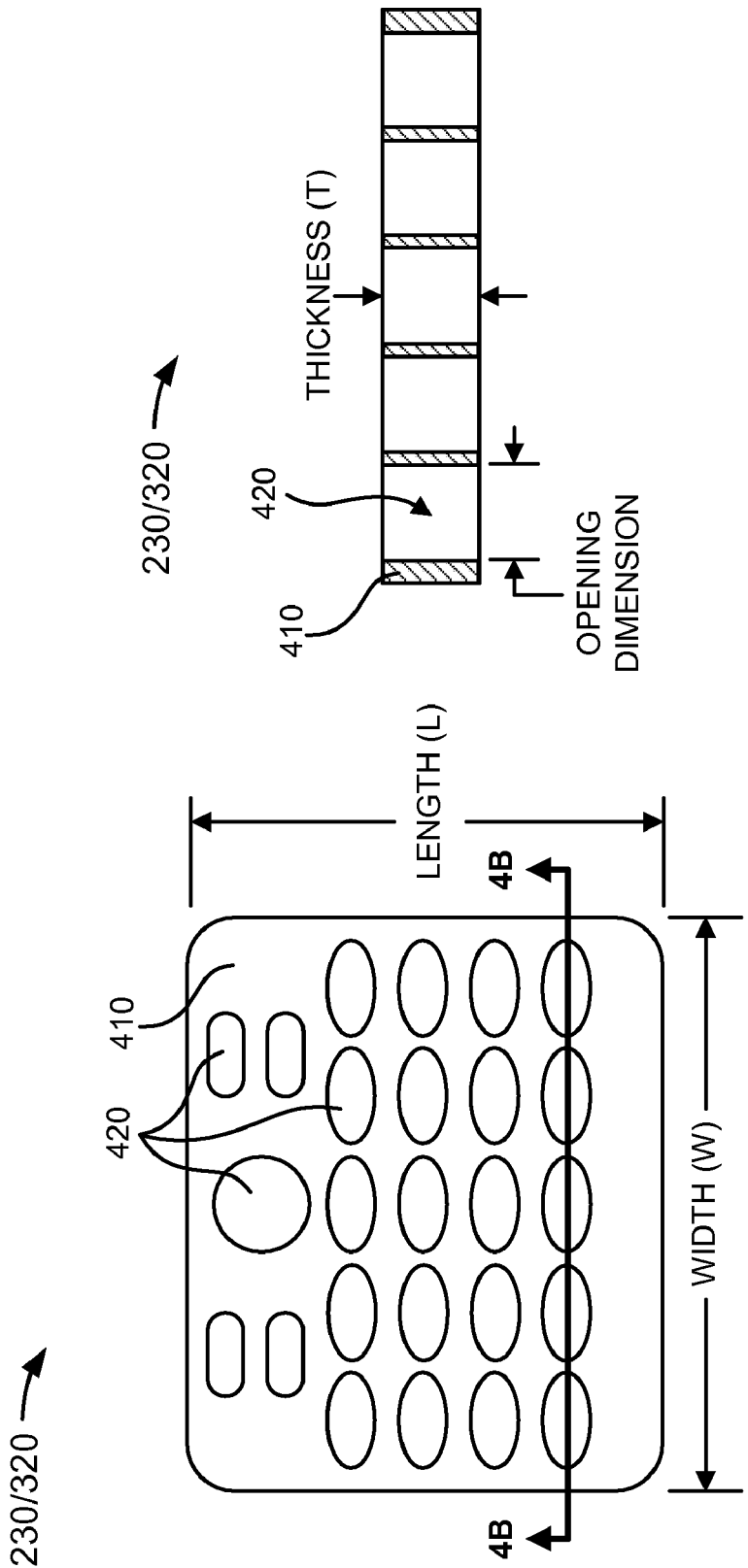

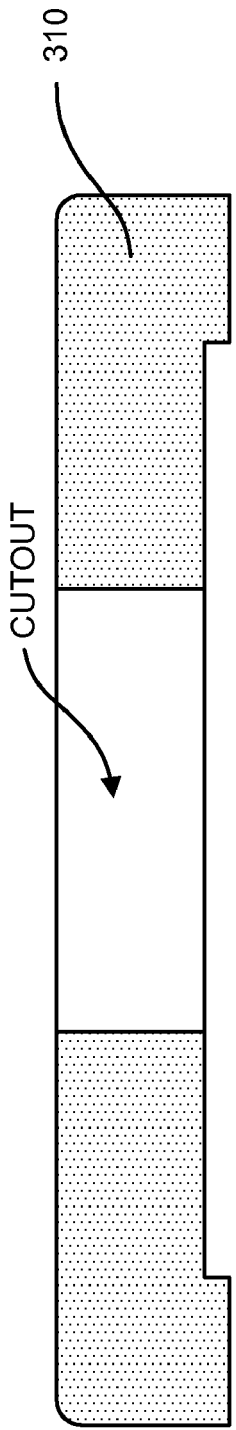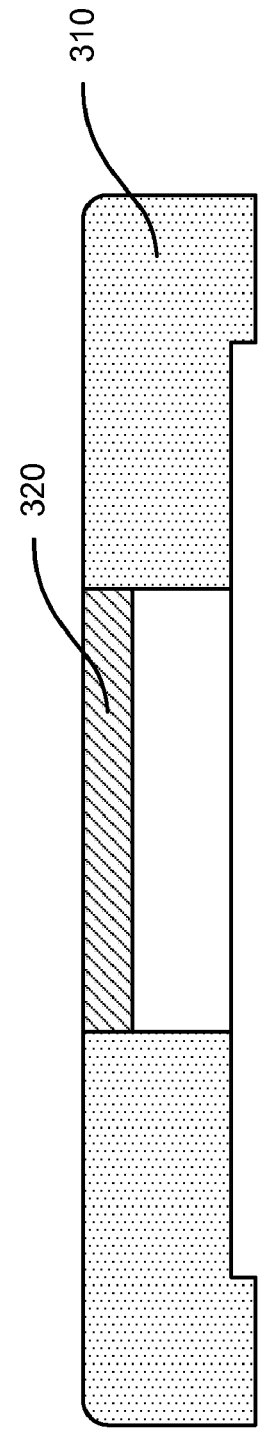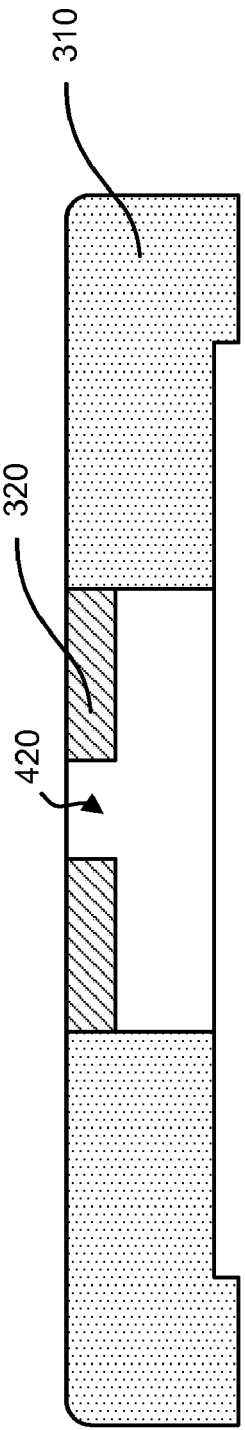

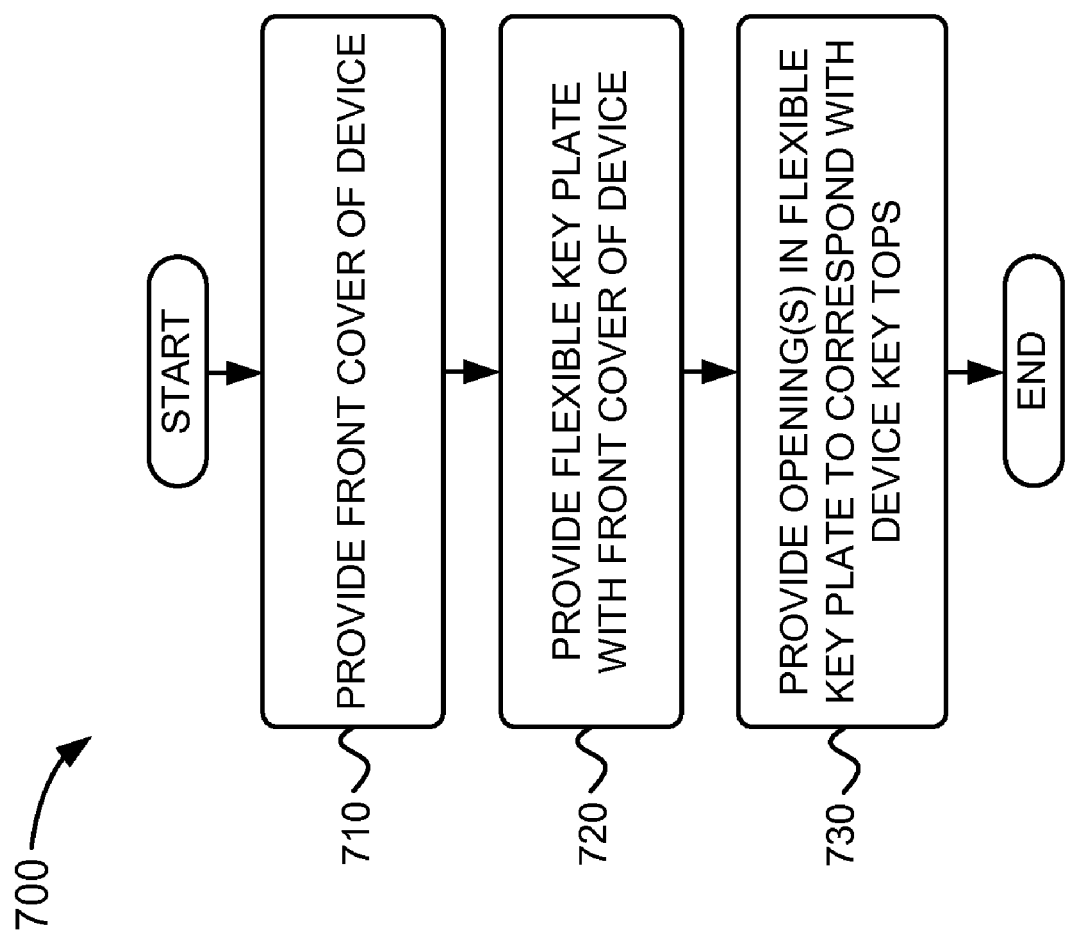

FLEXIBLE KEY PLATE

BACKGROUND

1. Field of the Invention

Implementations described herein relate generally to devices and, more particularly, to a flexible key plate for devices.

2. Description of Related Art

Small keyboards and key tops for devices (e.g., mobile communication devices) present problems when they attempt to provide large amounts of data input functions within the confines of the devices. For example, a mobile communication device may include a keyboard to enable a user to type information (e.g., an email). However, as such devices become smaller in size, the components of the keyboards (e.g., key tops) become smaller and/or more congested. Small key tops may dig into a finger before the key top begins to move. Accordingly, the finger may engage the front cover surface of the device, surrounding the key top, before an actuation force and/or key top movement has occurred to register a key press. Thus, small key tops generally need to extend higher above the front cover surface to ensure movement of the key top and/or registration of a key press. Unfortunately, such high key tops are not desirable in today's world of small, sleek devices.

One solution to this problem is to provide a thin plate or film keyboard that may act as a deflecting element, in lieu of a front cover. However, such thin plate keyboards do not provide independently moving key tops, and require a larger pitch between the keys in order to prevent two keys from being actuated at the same time. Since such thin plates or films are typically attached to a stiffer cover around the edges, the feeling of the keys will differ between the keys in the center and the keys closer to the edges.

SUMMARY

According to one aspect, a device may include a front cover with a cutout, a rear cover connected to the front cover, and a substrate including a key pad provided within the front cover and the rear cover. The key pad may be substantially aligned with the cutout of the front cover. The device may also include a key top provided adjacent to the key pad through the cutout of the front cover, and a flexible key plate provided over at least the cutout of the front cover and including an opening for receiving the key top.

Additionally, the flexible key plate may be provided within the cutout of the front cover.

Additionally, the flexible key plate may be removably connected to the front cover.

Additionally, the flexible key plate may be provided over at least a portion of a top surface of the front cover.

Additionally, the flexible key plate may be connected to the front cover.

Additionally, the flexible key plate may include at least one of a polycarbonate, a thermoplastic, an elastomer, or a metal.

Additionally, a thickness of the flexible key plate may range from about 0.05 millimeters (mm) to about 1.5 mm.

Additionally, a thickness of the flexible key plate may range from about 0.4 mm to about 0.6 mm.

Additionally, an actuation force of the key pad may be less than 1.6 Newtons (N).

Additionally, an actuation force of the key pad may be about 1.0 Newtons (N).

Additionally, the key top may extend about less than or equal to 0.25 mm above a top surface of the flexible key plate.

According to another aspect, a flexible key plate for a device with a key top, may include a body portion. The body portion may include at least one of a polycarbonate, a thermoplastic, an elastomer, or a metal, a thickness ranging from about 0.05 mm to about 1.5 mm, and an opening for receiving the key top of the device.

According to yet another aspect, a device may include a cover with a cutout, and a substrate including multiple key pads provided within the cover. The key pads may be substantially aligned with the cutout of the cover. The device may also include multiple key tops, each key top provided adjacent to a corresponding key pad through the cutout of the cover. The key tops may include variable heights based on a distance from a center of the cutout. The device may further include a flexible key plate provided over at least the cutout of the cover and including multiple openings, each opening of the flexible key plate receiving a corresponding one of the key tops.

Additionally, the heights of the key tops may increase as the distance from the center of the cutout increases.

Additionally, the variable heights of the key tops may enable an actuation force of each key top to be substantially equal.

Additionally, the flexible key plate may include at least one of a polycarbonate, a thermoplastic, an elastomer, or a metal.

Additionally, a thickness of the flexible key plate may range from about 0.05 mm to about 1.5 mm.

Additionally, a thickness of the flexible key plate may range from about 0.4 mm to about 0.6 mm.

According to a further aspect, a method may include providing a cover with a cutout for a device that includes multiple key tops, and providing a flexible key plate over at least the cutout of the cover. The flexible key plate may include at least one of a polycarbonate, a thermoplastic, an elastomer, or a metal, and may further include a thickness ranging from about 0.05 mm to about 1.5 mm. The method may also include forming openings in the flexible key plate for receiving the key tops.

Additionally, the method may include providing the flexible key plate within the cutout of the cover.

Additionally, the method may include removably connecting the flexible key plate to the cover.

Additionally, the method may include providing the flexible key plate over at least a portion of a top surface of the cover.

Additionally, the method may include connecting the flexible key plate to the cover.

According to still another aspect, a system may include means for providing a cover including a cutout, means for providing a substrate including a key pad within the cover, means for providing the key pad substantially aligned with the cutout of the cover, and means for providing a key top provided adjacent to the key pad through the cutout of the cover. The system may also include means for providing a flexible key plate over at least the cutout of the cover, and means for providing an opening in the flexible key plate for receiving the key top.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 2 is a partial side elevational view, in partial cross section, of the exemplary device of FIG. 1 with a flexible key plate according to an implementation consistent with principles of the invention;

FIG. 3 is a partial side elevational view, in partial cross section, of the exemplary device of FIG. 1 with a flexible key plate according to an implementation consistent with principles of the invention;

FIG. 4A is a top plan view of the flexible key plates of FIGS. 2 and 3 according to an implementation consistent with principles of the invention;

FIG. 4B is a cross-sectional side elevational view, taken along line 4B-4B of FIG. 4A, of the flexible key plates of FIGS. 2-4A;

FIGS. 6A-6C are cross-sectional side elevational views showing formation of a device front cover and the flexible key plate of FIG. 3 according to implementations consistent with principles of the invention; and FIG. 7 is a flowchart of an exemplary process according to an implementation consistent with principles of the invention.

DETAILED DESCRIPTION

The following detailed description of the invention refers to the accompanying drawings. The same reference numbers in different drawings may identify the same or similar elements. Also, the following detailed description does not limit the invention.

Implementations consistent with principles of the invention may relate to a flexible key plate for use in conjunction with small key tops of a device. By using a flexible key plate, a small key top may move the required distance to actuate a key stroke or press (e.g., collapse a dome key pad). The flexible key plate may also allow the small key top to be approximately flush and/or flush with the top surface of the flexible key plate. For example, in one implementation, a key plate made of a flexible material may be provided over a front cover of a device. Openings may be provided in the flexible key plate and/or may receive corresponding key tops of the device. Small key tops in combination with the flexible key plate may offer the possibility of varying extension heights (e.g., heights extending above the top surface of the flexible key plate) of the key tops, which may be used to compensate for the flexible key plate being stiffer near the front cover of the device. This may enable the feeling of the key tops to be substantially equal whether a key top is located in the center of the flexible key plate or closer to the front cover of the device (e.g., near an edge of the flexible key plate).

The description to follow will describe a device. As used herein, a "device" may include a radiotelephone; a personal communications system (PCS) terminal that may combine a cellular radiotelephone with data processing, a facsimile, and data communications capabilities; a personal digital assistant (PDA) that can include a radiotelephone, pager, Internet/intranet access, web browser, organizer, calendar, a Doppler receiver, and/or global positioning system (GPS) receiver; a laptop; a GPS device; a personal computer; an MP3 player (e.g., an iPod); a printer; a facsimile machine; a pager; a keyboard; a PDA keyboard; a wireless PDA keyboard; a calculator; and/or any other device capable of utilizing a keyboard.

Exemplary Devices

Figure 1:
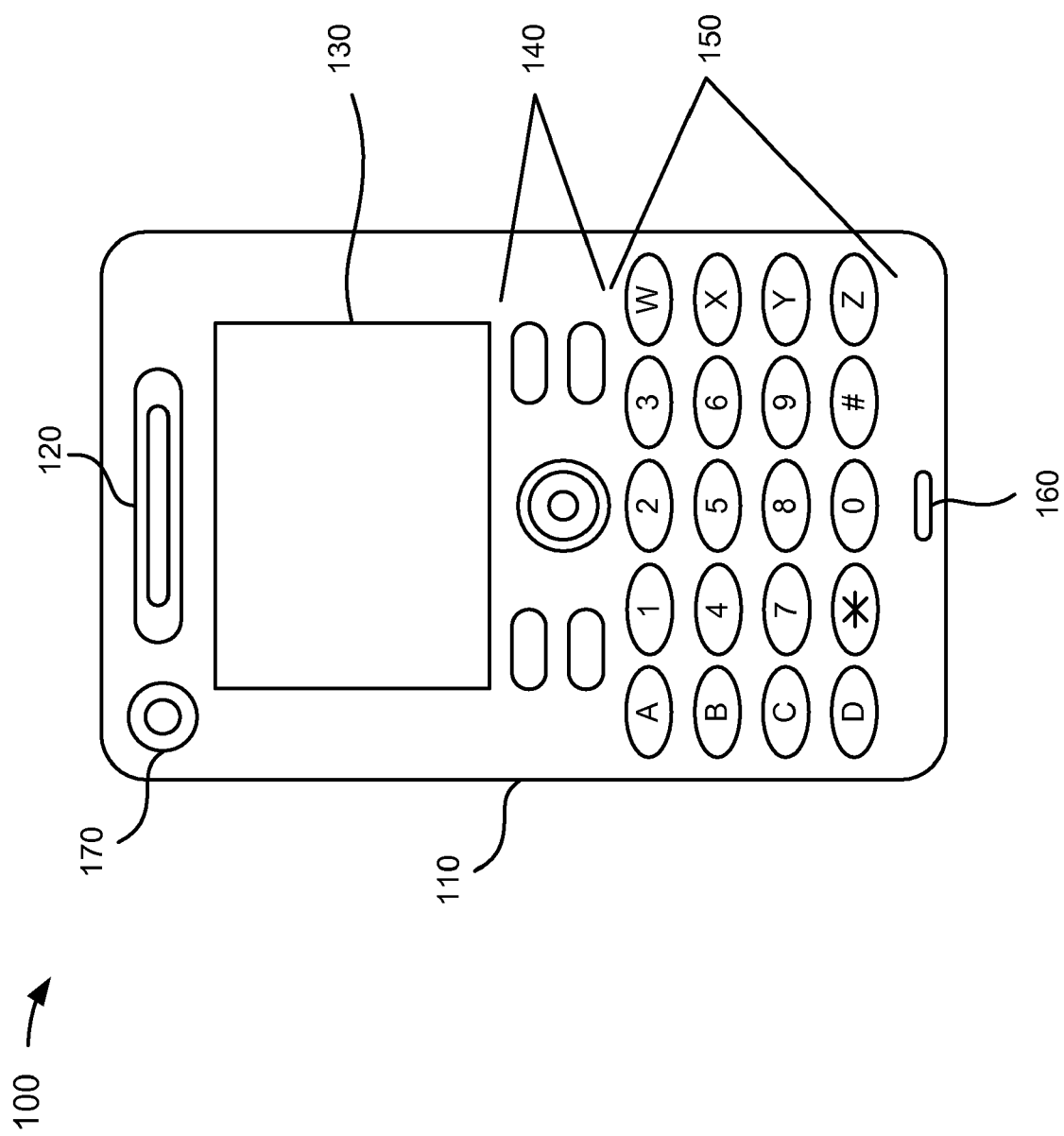
FIG. 1 is a diagram of an exemplary device in which systems and methods consistent with principles of the invention may be implemented.

FIG. 1 is a diagram of an exemplary device 100 according to an implementation consistent with principles of the invention. As shown in FIG. 1, device 100 may include a housing 110, a speaker 120, a display 130, control buttons 140, a keypad 150, a microphone 160, and/or a camera 170. Housing 110 may protect the components of device 100 from outside elements. Speaker 120 may provide audible information to a user of device 100. Display 130 may provide visual information to the user. For example, display 130 may provide information regarding incoming or outgoing calls, games, phone books, the current time, emails, etc. Control buttons 140 may permit the user to interact with device 100 to cause device 100 to perform one or more operations. Keypad 150 may include a standard telephone keypad and/or/or may include additional keys to enable typing information into device 100. Microphone 160 may receive audible information from the user. Camera 170 may enable a user to capture and/or store video and/or images (e.g., pictures).

First Exemplary Flexible Key Plate Arrangement

FIG. 2 is a partial side elevational view, in partial cross section, of the exemplary device of FIG. 1 with a flexible key plate according to an implementation consistent with principles of the invention. As shown in FIG. 2, device 100 may include a front cover 210, a rear cover 220, a flexible key plate 230, a substrate 240 containing key pads 250, key tops 260A-260C (collectively referred to herein as key tops 260) engaging corresponding key pads 250, and/or a key top guide 270 to guide key tops 260 in relation with corresponding key pads 250.

Front cover 210 and rear cover 220 may be combined to form housing 110 of device 100. In one implementation, front cover 210 and rear cover 220 may be two separate components that may be joined together using a variety of conventional connection mechanisms (e.g., heat treatment, adhesive, screws, bolts, etc.). In another implementation, front cover 210 and rear cover 220 may be integrally formed together as a single component. Front cover 210 may include a cutout in a portion of front cover 210 overlying substrate 240, key pads 250, key tops 260, and/or key top guide 270.

Front cover 210 and/or rear cover 220 may be formed in a variety of sizes and shapes depending on their use in device 100, and/or the size of device 100. For example, in one implementation, front cover 210 and/or rear cover 220 may be smaller in size if they are provided in a cellular phone, than if they are provided in a laptop. In another implementation, front cover 210 and/or rear cover 220 may have dimensions that ensure that the internal components of device 100 are adequately protected. The dimensions (e.g., lengths, widths, or thicknesses) of front cover 210 and/or rear cover 220 may depend on the material, shape, and/or the degree of protection to be provided by front cover 210 and/or rear cover 220. For example, smaller thicknesses may produce a less rigid, less protective housing 110.

Front cover 210 and/or rear cover 220 may be made from a variety of materials, including any of the materials used to make the housings of any of the devices described above. For example, in one implementation, front cover 210 and/or rear cover 220 may be made from thermoplastics, metals, elastomers (e.g., synthetic rubber and/or natural rubber), and/or other similar materials.

Flexible key plate 230 may be formed in a variety of shapes and sizes depending on its use in device 100, and/or the size of device housing 110. For example, in one implementation as shown in FIG. 2, flexible key plate 230 may be sized to cover front cover 210 and/or the cutout portion of front cover 210 (e.g., the portion of front cover 210 that receives key tops 260). In another implementation, flexible key plate 230 may be shaped to include openings (as described below in connection with FIGS. 4A and 4B) that may be shaped to receive corresponding key tops (e.g., key tops 260). The dimensions (e.g., length, width, or thickness) of flexible key plate 230 may depend on the material, shape, and/or the degree of flexibility to be provided by flexible key plate 230. For example, smaller thicknesses may produce a less rigid flexible key plate 230, depending upon the material selected for flexible key plate 230. The dimensions of flexible key plate 230 are further described below in connection with FIGS. 4A and 4B.

Flexible key plate 230 may connect to front cover 210 in a variety of ways. In one implementation, for example, flexible key plate 230 and front cover 210 may be joined together using a variety of conventional connection mechanisms (e.g., heat treatment, adhesive, screws, bolts, snap fit, etc.). Although FIG. 2 shows flexible key plate 230 being connected to front cover 210, in one implementation consistent with principles of the invention, flexible key plate 230 may be removable and/or replaceable from front cover 210. For example, flexible key plate 230 may be connected to front cover 210 with an adhesive. However, the adhesive may permit flexible key plate 230 to be removed from front cover 210. Such an arrangement may permit a user to switch flexible key plate 230 and/or provide a variety of flexible key plates (e.g., key plates having different colors, designs, images, etc.) for device 100.

Flexible key plate 230 may be made from a variety of materials depending upon the degree of flexibility to be provided by flexible key plate 230, as well as the desired shape and/or thickness of flexible key plate 230. For example, in one implementation, flexible key plate 230 may be made from polycarbonates, thermoplastics (e.g., polyethylene terephthalate (PET)), elastomers (e.g., synthetic rubber and/or natural rubber), metals, or other similar materials. The rigidity of the material selected for flexible key plate 230 may affect the thickness of flexible key plate 230, depending upon the desired degree of flexibility to be provided by flexible key plate 230. For example, if a metal material is selected for flexible key plate 230, flexible key plate 230 may be less thick than if a thermoplastic material is selected for flexible key plate 230 in order to provide the same degree of flexibility for flexible key plate 230.

Flexible key plate 230 may enable a small key top to move the required distance to actuate a key stroke (e.g., collapse a key pad), and/or may allow the small key top to be approximately flush and/or flush with the surface of flexible key plate 230. As described below in connection with FIGS. 4A and 4B, openings may be provided in flexible key plate 230 and/or may receive corresponding key tops 260 of device 100. Small key tops 260 in combination with flexible key plate 230 may offer the possibility of varying extension heights of key tops 260, which may be used to compensate for flexible key plate 230 being stiffer near front cover 210 of device 100. This may enable the feeling of key tops 260 to be substantially equal (e.g., the actuation forces of key tops 260 may be substantially equal) whether a key top is located in the center of flexible key plate 230 (e.g., key top 260C) or closer to front cover 230 of device 100 (e.g., key top 260A).

Substrate 240 may be provided below and/or be aligned with the cutout portion of front cover 210. Substrate 240 may include any electronics based substrate, e.g., a printed circuit board (PCB), rigid-flex circuits, flex circuits, semiconductor packages, multichip modules, micro electro mechanical systems (MEMS), ceramic circuits, etc. Substrate 240 may be formed in a variety of sizes and shapes depending upon its use in device 100, and/or the size of device 100. For example in one implementation, substrate 240 may be smaller in size if it is provided in a cellular phone, than if it is provided in a laptop computer. Substrate 240 may be made from a variety of materials, including any of the materials used to make existing electronics based substrates (e.g., PCBs). For example in one implementation, substrate 240 may include conductive pathways, or traces, which may be etched from copper sheets laminated onto a non-conductive substrate. Substrate 240 may include a variety of electrical components depending upon its use in the device. For example, substrate 240 may include switches, contacts, traces, capacitors, resistors, inductors, varistors, diodes, transistors, oscillators, resonators, relays, etc.

Key pads 250 may include a variety of types of key pads, e.g., raised dome key pads, membrane key pads, cone type key pads, double cone type key pads, double dome key pads, and/or any other type of key pad capable of actuating a function (e.g., a key press) of a device (e.g., via substrate 240 of device 100). In one exemplary implementation, key pads 250 may include dome shaped key pads having an actuation force less than 1.6 Newtons (N) (e.g., about 1.0 N). Key pads 250 may be formed in a variety of sizes and shapes depending upon their use in device 100, and/or the size of device 100. For example, in one implementation as shown in FIG. 2, key pads 250 may be dome shaped and/or may be arranged on substrate 240 in relation to corresponding key tops (e.g., key tops 260). Key pads 250 may be made from a variety of materials, including any of the materials used to make conventional key pads. For example, in one implementation, key pads may be made from elastomers (e.g., silicone rubber and/or natural rubber), thermoplastics, and/or other similar materials.

Key tops 260 may include a variety of types of key tops depending upon the device (e.g., device 100) utilizing key tops 260. For example, in one implementation, key tops 260 may include any conventional key tops used in the "devices" defined above (e.g., key tops 260 may correspond to control buttons 140 and/or keypad 150 of device 100 shown in FIG. 1). Key tops 260 may be formed in a variety of sizes and shapes depending upon their use in device 100, and/or the size of device 100. For example, in one implementation as shown in FIG. 2, key tops 260 may be cross shaped in cross section (i.e., may include a flange portion that may engage flexible key plate 230) and/or may be arranged in relation to corresponding key pads (e.g., key pads 250).

As further shown in FIG. 2, the extension heights of key tops 260 may be variable. For example, the extension height of key top 260A (e.g., the distance key top 260A extends above the top surface of flexible key plate 230) may be greater than the extension height of key top 260B because key top 260A is closer to front cover 210 than key top 260B. The extension height of key top 260B may be greater than the height of key top 260C because key top 260B is closer to front cover 210 than key top 260C. Varying the extension heights of key tops 260 may compensate for flexible key plate 230 being stiffer near front cover 210 of device 100. This may enable the feeling of key tops 260 to be substantially equal (e.g., the actuation force of key tops 260 may be substantially equal) whether a key top is located in the center of flexible key plate 230 (e.g., key top 260C) or closer to front cover 230 of device 100 (e.g., key top 260A). In one exemplary implementation, key tops 260 may be cylindrical in shape with a diameter of about 2 millimeters (mm), and/or may extend about less than or equal to 0.25 mm above the top surface of flexible key plate 230.

Key tops 260 may be made from a variety of materials, including any of the materials used to make conventional key tops. For example, in one implementation, key tops 260 may be made from elastomers (e.g., synthetic rubber and/or natural rubber), thermoplastics, and/or other similar materials. Although FIG. 2 shows key tops 260 being separate components from key pads 250, each key top 260 may be integrally formed with a corresponding key pad 250 as a single component. For example, in one implementation, the key tops may be omitted, and/or the key pads may be shaped to extend upward the same height as the key tops would extend above the top surface of flexible key plate 230.

Key tops 260 may be aligned with key pads 250 and/or openings in flexible key plate 230 with key top guide 270. Key top guide 270 may be formed in a variety of sizes and shapes depending upon its use in device 100, and/or the size of device 100. For example, in one implementation as shown in FIG. 2, key top guide 270 may be sized to align key tops 260 with corresponding key pads 250. Key top guide 270 may be made from a variety of materials, including any of the materials used to make conventional key top guides. For example, in one implementation, key top guide 270 may be made from elastomers (e.g., synthetic rubber and/or natural rubber), thermoplastics, metals, and/or other similar materials. Although not shown in FIG. 2, in one implementation consistent with principles of the invention, key top guide 270 may be omitted if flexible key plate 230 provides enough stability to maintain key tops 260 in relation to their corresponding key pads 250.

In an exemplary operation, a force may be applied by a user to a key top (e.g., key top 260A), and a switch provided within a key pad (e.g., key pad 250) may be closed. Specifically, the user's finger may exert a pressure on the key top (e.g., key top 206A) to depress the key top. With the key top pressing on the top of the key pad (e.g., key pad 250), the dome shape of the key pad may collapse temporarily, which may allow electrical contact between the key pad (e.g., key pad 250) and a substrate (e.g., substrate 240), thereby closing the circuit. When the finger pressure is released, the dome of the key pad may spring back to its original shape, breaking the circuit, and be ready for another actuation.

Second Exemplary Flexible Key Plate Arrangement

FIG. 3 is a partial side elevational view, in partial cross section, of the exemplary device of FIG. 1 with a flexible key plate according to an implementation consistent with principles of the invention. The device of FIG. 3 may contain similar components to the device of FIG. 2 but the flexible key plate may be arranged with the front cover of the device of FIG. 3 in a different manner than the device of FIG. 2. As shown in FIG. 3, device 100 may include a front cover 310, rear cover 220, a flexible key plate 320, substrate 240 containing key pads 250, key tops 260 engaging corresponding key pads 250, and/or key top guide 270 to guide key tops 260 in relation with corresponding key pads 250. In one implementation, rear cover 220, substrate 240, key pads 250, key tops 260, and/or key top guide 270 may include all of the features (e.g., size, shape, materials, etc.) discussed above in connection with FIG. 2.

Front cover 310 may include all of the features (e.g., size, shape, materials, etc.) discussed above in connection with FIG. 2 for front cover 210. For example, front cover 310 may include a cutout in a portion of front cover 310 overlying substrate 240, key pads 250, key tops 260, and/or key top guide 270. Flexible key plate 320 may include all of the features (e.g., size, shape, materials, etc.) discussed above in connection with FIG. 2 for flexible key plate 230. However, as shown in FIGS. 2 and 3, front cover 310 may be thicker than front cover 210, and/or flexible key plate 320 may not be provided over front cover 310 the way flexible key plate 230 may be provided over front cover 210. Rather, flexible key plate 320 may be provided within the cutout of front cover 310 that overlies substrate 240, key pads 250, key tops 260, and/or key top guide 270.

In one implementation, flexible key plate 320 may be provided within the cutout of front cover 310, and/or may be connected to front cover 310 using a variety of conventional connection mechanisms (e.g., heat treatment, adhesive, screws, bolts, snap fit, etc.). In another implementation, flexible key plate 320 may be fitted within the cutout of front cover 310 (e.g., via thermal compression/expansion techniques, by applying a force etc.), but may not be connected to front cover 310. Thus, flexible key plate 320 may be removable and/or replaceable from front cover 310. Such an arrangement may permit a user to switch flexible key plate 320 and/or provide a variety of flexible key plates (e.g., key plates having different colors, designs, images, etc.) for device 100.

Components of First and Second Exemplary Flexible Key Plates

FIG. 4A is a top plan view of the flexible key plates (e.g., flexible key plates 230 and/or 320) of FIGS. 2 and 3 according to an implementation consistent with principles of the invention. FIG. 4B is a cross-sectional side elevational view, taken along line 4B-4B of FIG. 4A, of the flexible key plates (e.g., flexible key plates 230 and/or 320) of FIGS. 2-4A. As shown in FIGS. 4A and 4B, flexible key plates 230/320 may include a body portion 410 made from, for example, the materials described above in connection with FIG. 2 for flexible key plate 230. Body portion 410 may have a variety of shapes and sizes depending upon the size and shape of the device (e.g., device 100) using body portion, as well as the arrangement, size, and/or shape of the key tops (e.g., key tops 260) used in the device. In one implementation, for example, body portion 410 may have a length (L) and/or a width (W) such that body portion 410 may cover the spaces between at least control buttons 140 and/or keypad 150 of device 100 shown in FIG. 1. In another implementation, body portion 410 may have a length (L) and/or a width (W) such that body portion 410 may cover a portion of front cover 210 and/or spaces between key tops 260 (e.g., within the cutout of front cover 210) of the device shown in FIG. 2. In still another implementation, body portion 410 may have a length (L) and/or width (W) such that body portion 410 may cover the spaces between key tops 260 (e.g., within the cutout of front cover 310) of the device shown in FIG. 3.

As further shown in FIG. 4B, the thickness (T) of body portion 410 may be dependent upon the material selected for flexible key plate 230 and/or 320, and/or the desired degree of flexibility to be provided by flexible key plate 230 and/or 320. For example, in one implementation, body portion 410 may have a thickness (T) ranging from about 0.05 mm to about 1.5 mm, depending upon the material selected and/or desired degree of flexibility for flexible key plate 230 and/or 320. In another implementation, body portion 410 may have thickness (T) ranging from about 0.4 mm to about 0.6 mm, depending upon the material selected and/or desired degree of flexibility for flexible key plate 230 and/or 320.

As further shown in FIGS. 4A and 4B, body portion 410 may include multiple openings 420 extending through body portion 410. Openings 420 may be arranged and/or shaped in a variety of ways. In one implementation, for example, openings 420 may be arranged and/or shaped to correspond with the arrangement and/or shapes respective of control buttons 140 and/or keypad 150 of device 100 of FIG. 1. In another implementation, openings 420 may be arranged and/or shaped to correspond with the arrangement and/or shapes of respective key tops 260 of the devices of FIGS. 2 and 3. As shown in FIG. 4B, openings 420 may have a variety of dimensions. For example, in one implementation, openings 420 may have dimensions of approximately the same size as dimensions of corresponding control buttons 140 and/or keypad 150 of device 100 of FIG. 1. In another implementation, openings 420 may have dimensions of approximately the same size as dimensions of corresponding key tops 260 of the devices of FIGS. 2 and 3. In other words, openings 420 of flexible key plates 230 and/or 320 may be sized and/or shaped to accommodate the sizes and/or shapes of the mechanisms (e.g., key tops 260) to be provided through and/or within openings 420. In still another embodiment, openings 420 of flexible key plates 230 and/or 320 may be sized and/or shaped to accommodate the sizes and/or shapes of key pads that may be provided through and/or within openings 420 if the key tops are omitted.

Exemplary Processes

Figure 5A:
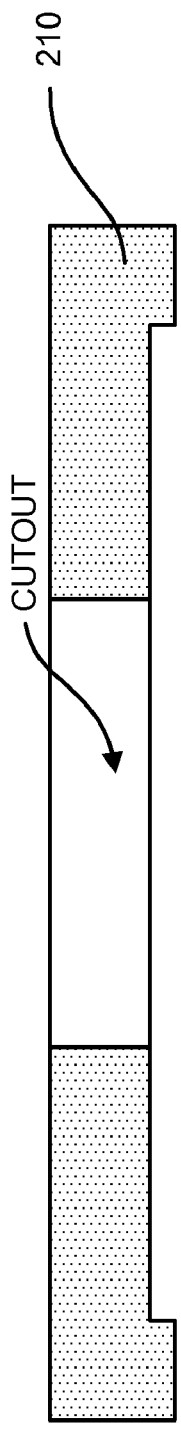
FIGS. 5A-5C are cross-sectional side elevational views showing formation of a device front cover and the flexible key plate of FIG. 2 according to implementations consistent with principles of the invention.
Figure 5B:
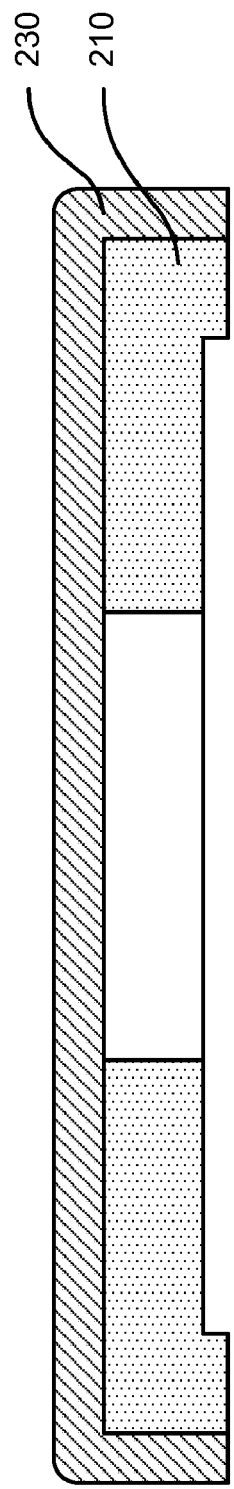
Figure 5C:
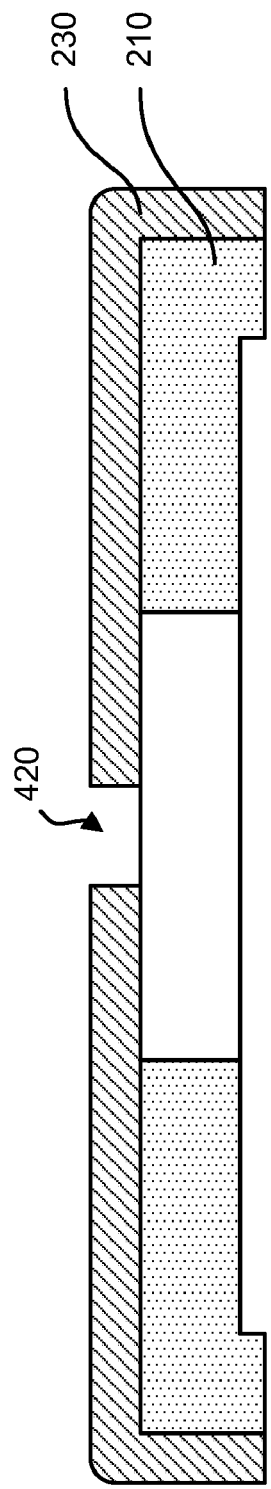

FIGS. 5A-5C are cross-sectional side elevational views showing a process of forming a device front cover and/or the flexible key plate of FIG. 2 according to implementations consistent with principles of the invention. FIGS. 6A-6C are cross-sectional side elevational views showing a process of forming a device front cover and/or the flexible key plate of FIG. 3 according to implementations consistent with principles of the invention. FIG. 7 is a flowchart of an exemplary process according to an implementation consistent with principles of the invention.

Process of Forming the First Exemplary Flexible Key Plate Arrangement

As shown in FIG. 5A, a front cover (e.g., front cover 210) that includes a cutout may be provided. As shown in FIG. 5B, a flexible key plate (e.g., flexible key plate 230) may be provided over and/or connected to the front cover (e.g., front cover 210), and/or may cover the cutout of the front cover. For example, in one implementation described above in connection with FIG. 2, flexible key plate 230 and front cover 210 may be joined together using a variety of conventional connection mechanisms (e.g., heat treatment, adhesive, screws, bolts, snap fit etc.). In another implementation, flexible key plate 230 may be removable and/or replaceable from front cover 210. For example, flexible key plate 230 may be connected to front cover 210 with an adhesive.

As shown in FIG. 5C, an opening(s) (e.g., openings 420) may be formed in the flexible key plate (e.g., flexible key plate 230). For example, in one implementation described above in connection with FIGS. 4A and 4B, body portion 410 of flexible key plate 230 may include openings 420 that may be arranged, sized, and/or shaped in a variety of ways. In another implementation, opening(s) (e.g., openings 420) may be provided in the flexible key plate before or after the flexible key plate is provided on the front cover.

Process of Forming the Second Exemplary Flexible Key Plate Arrangement

As shown in FIG. 6A, a front cover (e.g., front cover 310) that includes a cutout may be provided. As shown in FIG. 6B, a flexible key plate (e.g., flexible key plate 320) may be connected to the front cover (e.g., front cover 310), and/or may cover the cutout of the front cover. For example, in one implementation described above in connection with FIG. 3, flexible key plate 320 and front cover 310 may be joined together using a variety of conventional connection mechanisms (e.g., heat treatment, adhesive, screws, bolts, etc.). In another implementation, flexible key plate 320 may be fitted within the cutout of front cover 310 (e.g., via thermal compression/expansion techniques, by applying a force, etc.), but may not be connected to front cover 310. Thus, flexible key plate 320 may be removable and/or replaceable from front cover 310.

As shown in FIG. 6C, an opening(s) (e.g., openings 420) may be formed in the flexible key plate (e.g., flexible key plate 320). For example, in one implementation described above in connection with FIGS. 4A and 4B, body portion 410 of flexible key plate 320 may include openings 420 that may be arranged, sized, and/or shaped in a variety of ways. In another implementation, opening(s) (e.g., openings 420) may be provided in the flexible key plate before or after the flexible key plate is provided on the front cover.

Exemplary Process

As shown in FIG. 7, a process 700 may provide a front cover of a device (block 710). For example, in one implementation described above in connection with FIGS. 5A and 6A, a front cover (e.g., front cover 210 or front cover 310) that includes a cutout may be provided. Process 700 may provide a flexible key plate with the front cover of the device (block 720). For example, in one implementation described above in connection with FIG. 5B, a flexible key plate (e.g., flexible key plate 230) may be provided over and/or connected to the front cover (e.g., front cover 210), and/or may cover the cutout of the front cover. In one implementation described above in connection with FIG. 2, flexible key plate 230 and front cover 210 may be joined together using a variety of conventional connection mechanisms (e.g., heat treatment, adhesive, screws, bolts, etc.). In another implementation, flexible key plate 230 may be removable and/or replaceable from front cover 210.

Process may provide opening(s) in the flexible key plate to correspond with key tops of the device (block 730). For example, in one implementation described above in connection with FIGS. 5C and 6C, opening(s) (e.g., opening 420) may be formed in the flexible key plate (e.g., flexible key plate 230 and/or flexible key plate 320). As described above in connection with FIGS. 4A and 4B, openings 420 may be arranged and/or shaped to correspond with the arrangement and/or shapes of respective control buttons 140 and/or keypad 150 of device 100 of FIG. 1. In another implementation, openings 420 may be arranged and/or shaped to correspond with the arrangement and/or shapes of key tops 260 of the devices of FIGS. 2 and 3.

CONCLUSION

Implementations consistent with principles of the invention may relate to a flexible key plate for use in conjunction with small key tops of a device. By using a flexible key plate, a small key top may move the required distance to actuate a key stroke, and/or may allow the small key top to be approximately flush and/or flush with the top surface of the flexible key plate. Openings may be provided in the flexible key plate and/or may receive corresponding key tops of the device. Small key tops in combination with the flexible key plate may offer the possibility of varying extension heights of the key tops, which may be used to compensate for the flexible key plate being stiffer near the front cover of the device. This may enable the feeling of the key tops to be substantially equal whether a key top is located in the center of the flexible key plate or closer to the front cover of the device.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, while series of acts have been described with regard to FIGS. 5A-7, the order of the acts may be modified in other implementations consistent with principles of the invention. Further, non-dependent acts may be performed in parallel.

It should be emphasized that the term "comprises/comprising" when used in the this specification is taken to specify the presence of stated features, integers, steps or components but does not preclude the presence or addition of one or more other features, integers, steps, components or groups thereof.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with principles of the invention is not limiting of the invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device comprising:
    a front cover including a cutout;
    a rear cover connected to the front cover;
    a substrate including a key pad, having a plurality of keys, provided within a cavity defined by the front cover and the rear cover, the key pad being substantially aligned with the cutout of the front cover;
    a plurality of key tops, corresponding to the plurality of keys, and provided adjacent to the corresponding plurality of keys through the cutout of the front cover, the plurality of key tops including variable heights that increase as a distance from a center of the cutout increases to enable an actuation force of each of the plurality of key tops to be substantially equal; and
    a flexible key plate provided over at least the cutout of the front cover and including a plurality of openings to receive a corresponding one of the plurality of key tops.

2. The device of claim 1, wherein the flexible key plate is provided within the cutout of the front cover.

3. The device of claim 2, where the flexible key plate is removably connected to the front cover.

4. The device of claim 1, where the flexible key plate is provided over at least a portion of a top surface of the front cover.

5. The device of claim 4, where the flexible key plate is connected to the front cover.

6. The device of claim 4, where the flexible key plate is removably connected to the front cover.

7. The device of claim 1, where the flexible key plate comprises at least one of a polycarbonate, a thermoplastic, an elastomer, or a metal.

8. The device of claim 1, wherein a thickness of the flexible key plate ranges from about 0.05 millimeters (mm) to about 1.5 mm.

9. The device of claim 1, wherein a thickness of the flexible key plate ranges from about 0.4 mm to about 0.6 mm.

10. The device of claim 1, wherein an actuation force of the key pad is less than 1.6 Newtons (N).

11. The device of claim 1, wherein an actuation force of the key pad is about 1.0 Newtons (N).

12. The device of claim 1, where at least one key top of the plurality of key tops extends about less than or equal to 0.25 mm above a top surface of the flexible key plate.

13. A device comprising:
    a cover including a cutout;
    a substrate including a plurality of key pads provided within the cover, the plurality of key pads being substantially aligned with the cutout of the cover;
    a plurality of key tops, each key top provided adjacent to a corresponding key pad through the cutout of the cover, the plurality of key tops including variable heights that increase as a distance from a center of the cutout increases; and
    a flexible key plate provided over at least the cutout of the cover and including a plurality of openings, each opening of the flexible key plate receiving a corresponding one of the plurality of key tops, where a portion of the flexible key plate, adjacent to the cover, is more rigid than remaining portions of the flexible key plate, and the variable heights of the plurality of key tops compensate for the more rigid portion of the flexible key plate to enable an actuation force of each of the plurality of key tops to be substantially equal.

14. The device of claim 13, wherein the flexible key plate comprises at least one of a polycarbonate, a thermoplastic, an elastomer, or a metal.

15. The device of claim 13, wherein a thickness of the flexible key plate ranges from about 0.05 mm to about 1.5 mm.

16. The device of claim 13, wherein a thickness of the flexible key plate ranges from about 0.4 mm to about 0.6 mm.

17. A method comprising:
    providing a cover with a cutout for a device that includes a plurality of key tops, the plurality of key tops being substantially aligned with the cutout of the cover, and the plurality of key tops including variable heights that increase as a distance from a center of the cutout increases to enable an actuation force of each of the plurality key tops to be substantially equal;
    providing a flexible key plate over at least the cutout of the cover, the flexible key plate comprising at least one of a polycarbonate, a thermoplastic, an elastomer, or a metal, and further comprising a thickness ranging from about 0.05 mm to about 1.5 mm; and
    forming a plurality openings in the flexible key plate for receiving the plurality of key tops.

18. The method of claim 17, further comprising:
    providing the flexible key plate within the cutout of the cover.

19. The method of claim 18, further comprising:
    removably connecting the flexible key plate to the cover.

20. The method of claim 17, further comprising:
    providing the flexible key plate over at least a portion of a top surface of the cover.

21. The method of claim 20, further comprising:
    connecting the flexible key plate to the cover.

22. The method of claim 20, further comprising:
    removably connecting the flexible key plate to the cover.

23. A system comprising:

means for providing a cover including a cutout;

means for providing a substrate, including a key pad having a plurality of keys, within a cavity defined by the cover;

means for providing the key pad substantially aligned with the cutout of the cover;

means for providing a plurality of key tops, corresponding to the plurality of keys, and adjacent to the key pad through the cutout of the cover, the plurality of key tops including variable heights that increase as a distance from a center of the cutout increases to enable an actuation force of each of the plurality of key tops to be substantially equal;

means for providing a flexible key plate over at least the cutout of the cover; and means for providing an opening in the flexible key plate for receiving the plurality of key tops.

24. A flexible key plate for a device including a plurality of key tops having variable heights, and a front cover having a cutout, the flexible key plate comprising:

a plurality of openings for receiving a corresponding one of the plurality of key tops; and a portion adjacent to the front cover that is more rigid than remaining portions of the flexible key plate, where the flexible key plate is provided over at least the cutout of the front cover, and the variable heights of the plurality of key tops compensate for the more rigid portion of the flexible key plate to enable an actuation force of each of the plurality of key tops to be substantially equal.

* * * * *

UNITED STATES PATENT AND TRADEMARK OFFICE
CERTIFICATE OF CORRECTION

PATENT NO. : 7,804,955 B2  Page 1 of 1
APPLICATION NO. : 11/425584
DATED : September 28, 2010
INVENTOR(S) : Stjepan Begic et al.

It is certified that error appears in the above-identified patent and that said Letters Patent is hereby corrected as shown below:

Column 11, claim 2, line 54, the word "wherein" should be changed to read --where--.

Column 12, claim 8, line 1, the word "wherein" should be changed to read --where--.

Column 12, claim 9, line 4, the word "wherein" should be changed to read --where--.

Column 12, claim 10, line 6, the word "wherein" should be changed to read --where--.

Column 12, claim 11, line 8, the word "wherein" should be changed to read --where--.

Column 12, claim 14, line 33, the word "wherein" should be changed to read --where--.

Column 12, claim 15, line 36, the word "wherein" should be changed to read --where--.

Column 12, claim 16, line 39, the word "wherein" should be changed to read --where--.

Signed and Sealed this

Twenty-first Day of December, 2010

David J. Kappos
*Director of the United States Patent and Trademark Office*